United States Patent [19]

Hazenbroek et al.

[11] Patent Number: 4,682,386
[45] Date of Patent: Jul. 28, 1987

[54] POULTRY BREAST FILLETING SYSTEM

[75] Inventors: Jacobus E. Hazenbroek; Bastiaan Verrijp, both of Numansdorp, Netherlands; William L. Wallbridge, Sherfield, England

[73] Assignee: Systemate B.V., Numansdorp, Netherlands

[21] Appl. No.: 872,172

[22] Filed: Jun. 9, 1986

Related U.S. Application Data

[63] Continuation-in-part of Ser. No. 630,658, Jul. 13, 1984, Pat. No. 4,593,432.

[51] Int. Cl.[4] .................... A22C 21/00; A22C 17/04
[52] U.S. Cl. ..................................... 17/46; 17/1 G; 17/11
[58] Field of Search ......................... 17/11, 46, 1 G

[56] References Cited

U.S. PATENT DOCUMENTS

| | | | |
|---|---|---|---|
| 4,557,017 | 12/1985 | Gasbarro | 17/11 |
| 4,567,624 | 2/1986 | van Mil | 17/11 |
| 4,593,432 | 6/1986 | Hazenbroek | 17/11 |

Primary Examiner—Willie G. Abercrombie
Attorney, Agent, or Firm—Thomas & Kennedy

[57] ABSTRACT

Previously eviscerated poultry carcasses with wings and saddle removed are moved on a series of carcass carriers (20) along a processing path with protrusions (32, 33) extending into the wing sockets of the carcass to hold the carcass on the carrier. A series of meat removing implements (46, 47, 60, 61, 62, 96, 116, 118 and 119) separate the meat from the skeletal structures of the carcass as the carcasses are moved along the processing path.

6 Claims, 8 Drawing Figures

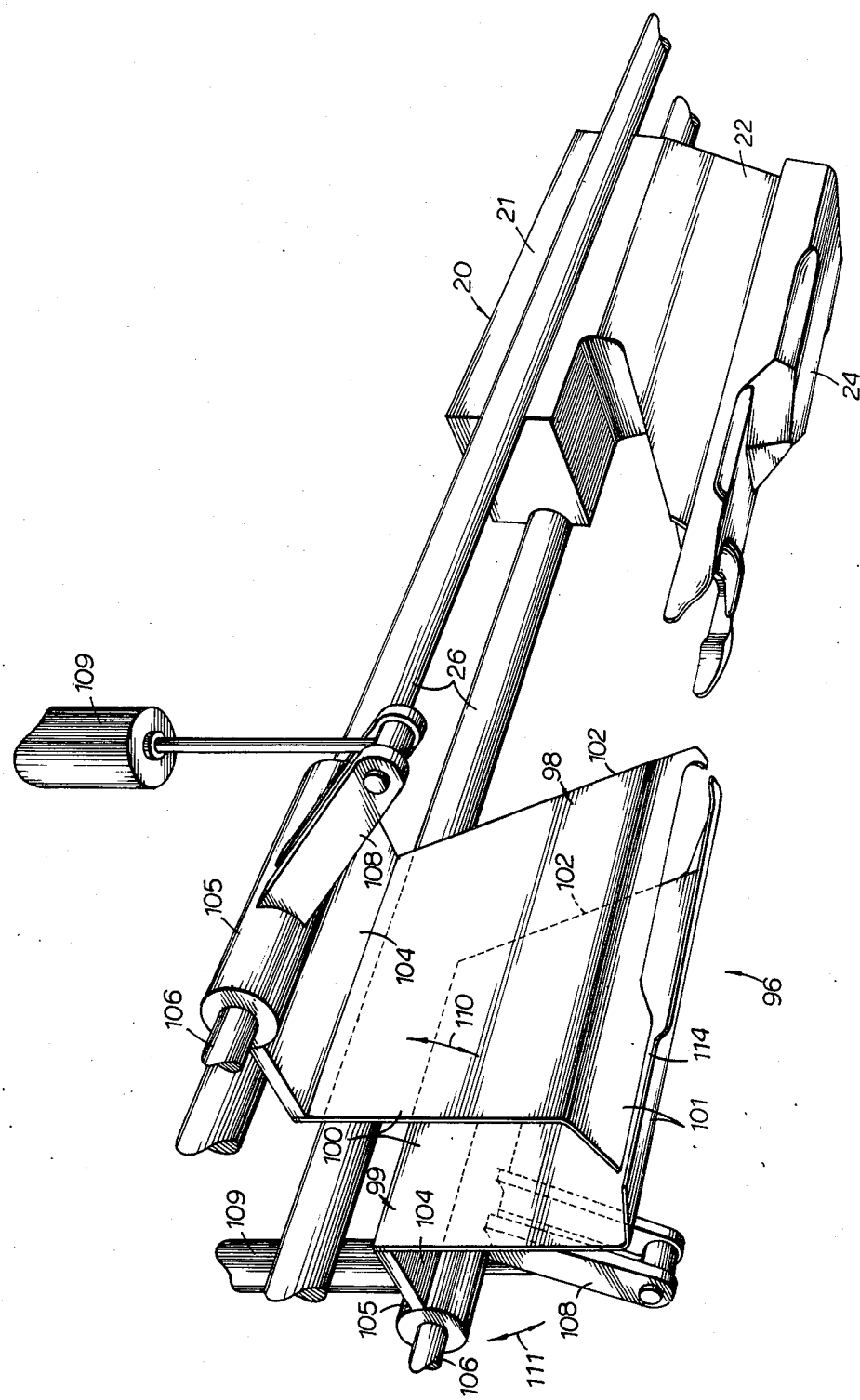

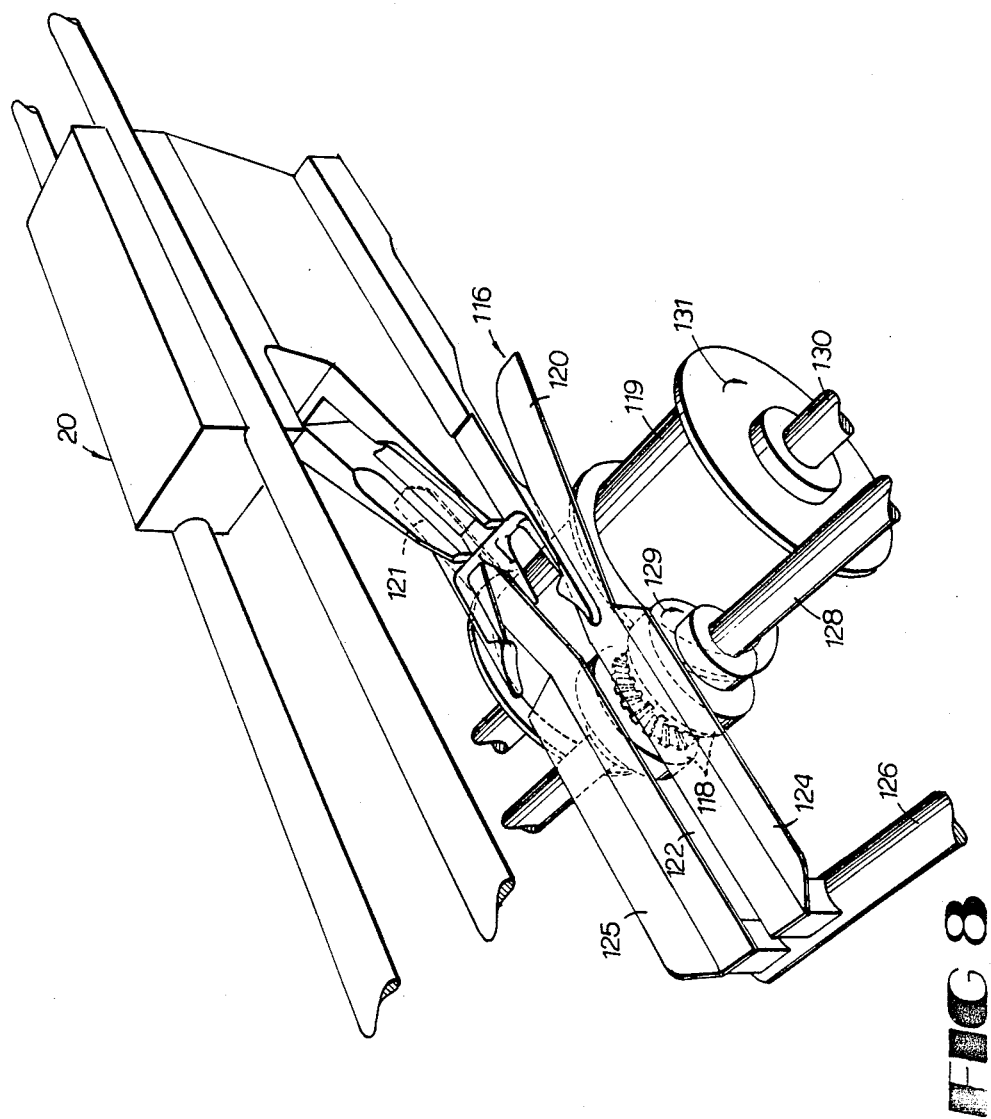

POULTRY BREAST FILLETING SYSTEM

CROSS REFERENCE TO RELATED PATENT

This application is a continuation-in-part of U.S. patent application Ser. No. 630,658 filed July 13, 1984, now U.S. Pat. No. 4,593,432, issued June 10, 1986.

FIELD OF THE INVENTION

This invention relates to a method and apparatus for automatically separating the meat from the skeletal structure of the breast and adjacent back portions of a previously eviscerated poultry carcass.

BACKGROUND OF THE INVENTION

In the processing of edible poultry, such as chickens and turkeys, it is desirable to separate the meat from the skeletal structure of the poultry carcass so that the meat can be marketed separately, without the bone contained in the meat. The all meat product can be attractively packaged and sold at the grocery store, and can be sold to restaurants where the meat can be cooked and served in sandwiches or served in relatively small portions which are easy to eat and without requiring the consumer to separate the meat from the bone.

The in past, the process of filleting poultry parts, such as thighs and breasts, has been achieved by hand, with workers manually stripping the meat from the bone. More recently, automated equipment has become available which will function to separate the meat from the bone of poultry thighs, wherein the bone is of substantially rectilinear shape and the meat can be scraped longitudinally off the bone. For example, U.S. Pat. Nos. 3,402,423, 3,533,128, 3,672,000, 4,068,350, 4,327,463, 4,377,884, 4,402,112 and 4,495,675 all disclose apparatus for deboning poultry thighs and similar products wherein the bone is moved along its length through scraping blades which tend to scrape the meat from the bone.

Although automated equipment has been developed which successfully functions to debone poultry thighs, the skeletal structure of the breast and related parts of the poultry carcass are of more complex configuration, and it is more difficult to separate the meat and bone from this portion of the carcass. As a result, the conventional methods for separating the meat from the skeletal structure of the poultry breast and related poultry parts has been performed by hand. For example, U.S. Pat. No. 4,385,419 illustrates equipment wherein eviscerated poultry carcasses are conveyed on supports along a path and workers cut the poultry parts from the carcass by hand at several stations along the path.

More recently, automated equipment has been developed which operates to remove the meat from the breast portion of the poultry carcass. For example, U.S. Pat. No. 4,593,432 discloses a system by which previously eviscerated poultry carcasses with the wings and the legs removed therefrom are eviscerated by mounting each carcass with its visceral cavity extending about a mandrel, and moving the mandrel along a path through a gate which tends to gouge and scrape the meat from the carcass.

SUMMARY OF THE INVENTION

Briefly described, the present invention comprises a poultry breast filleting system by which previously eviscerated poultry carcasses are automatically filleted, by mounting poultry carcasses with wings and legs removed on a series of mandrels or carcass carriers and moving the carcasses on the carriers along a work path where a series of implements engage and remove the meat from the skeletal structure of the carcass.

Each carrier is of duplicate design and includes a leading portion that generally conforms to the shape of the eviscerated cavity of a bird, and a pair of wing socket protrusions extends in the direction of movement of the carrier. The wing socket protrusions are sized and shaped so as to have the carcass mounted with its open wing sockets mounted on the protrusions. The mounting of the carcass on the carrier in this manner positively locates each carcass in a predetermined attitude on its carrier, and the carrier is shaped so as to support the remaining skeletal structure in a predetermined configuration so as to prevent the skeletal structure from collapsing as the carcass is processed.

As the carcass is moved by its carrier along the processing path, the implements that engage the meat of the carcass tend to apply forces to the carcass that are directed toward the skeletal structure and along the surface of the skeletal structure, which tends to cause the skeletal structure to be supported by the carrier, resulting in little if any damage to the skeletal structure during the meat removal process.

Thus, it is an object of this invention to provide an automated poultry breast filleting system wherein the previously eviscerated poultry carcasses with legs and wings removed can be moved in series along a processing path and the meat can be progressively separated from the skeletal structure of the carcasses substantially without causing the breakage of bones of the skeletal structure.

Another object of this invention is to provide an automated system for reliably and rapidly filleting poultry breasts.

Other objects, features and advantages of this invention will become apparent upon reading the following specification, when taken in conjunction with the accompanying drawings.

BRIEF DESCRIPTION OF THE DRAWINGS

FIG. 7 is a detail illustration of the tunnel assembly and how the carcass carrier passes through the tunnel assembly.

FIG. 8 is a detailed illustration of the fillet catcher with the fillet remover and fillet roll positioned below the fillet catcher, and demonstrating the manner in which the carcass carrier passes over the fillet catcher.

DETAILED DESCRIPTION

Figure 1:
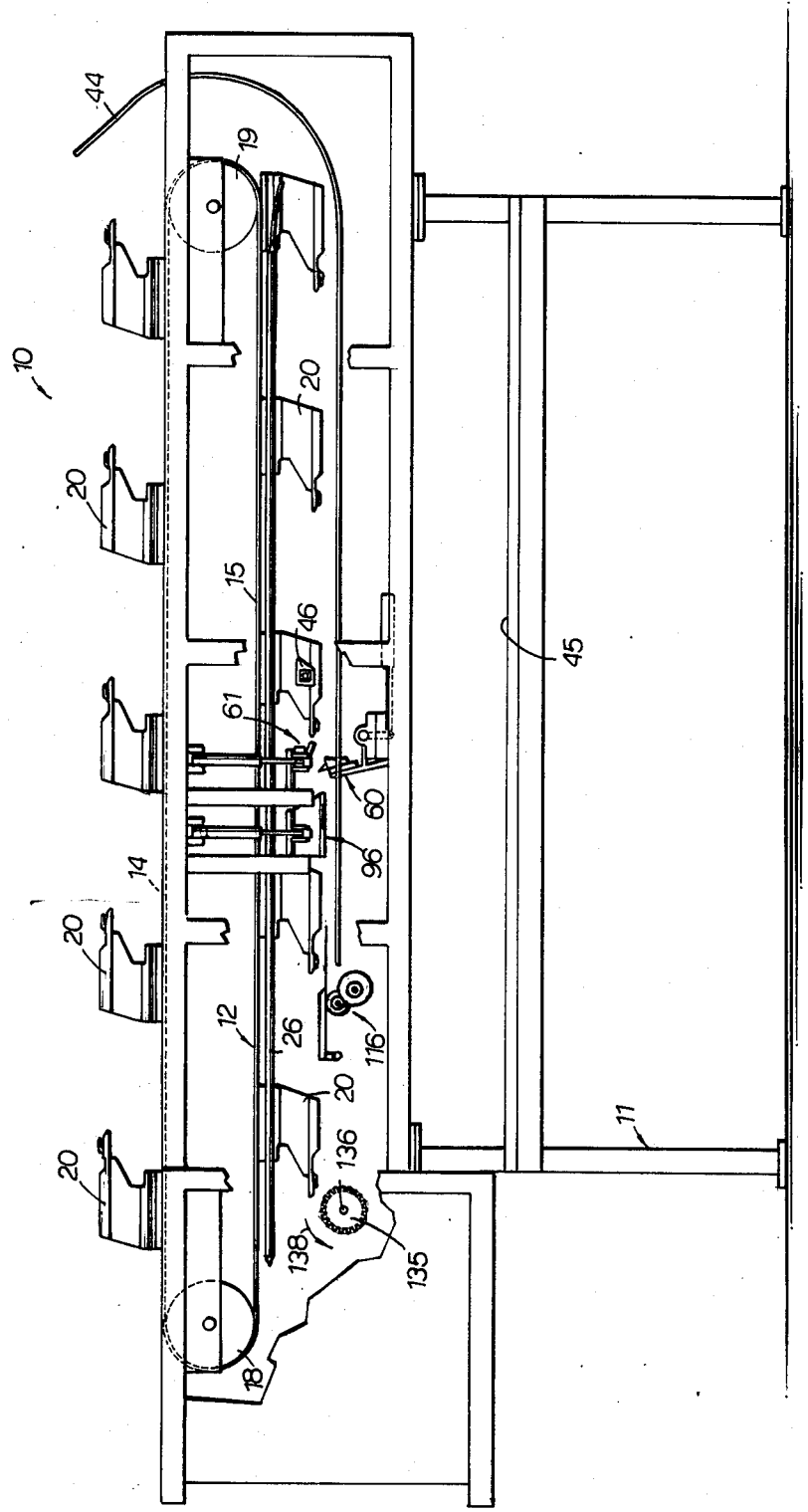
FIG. 1 is a side elevational view of the poultry breast filleting system.
Figure 2:
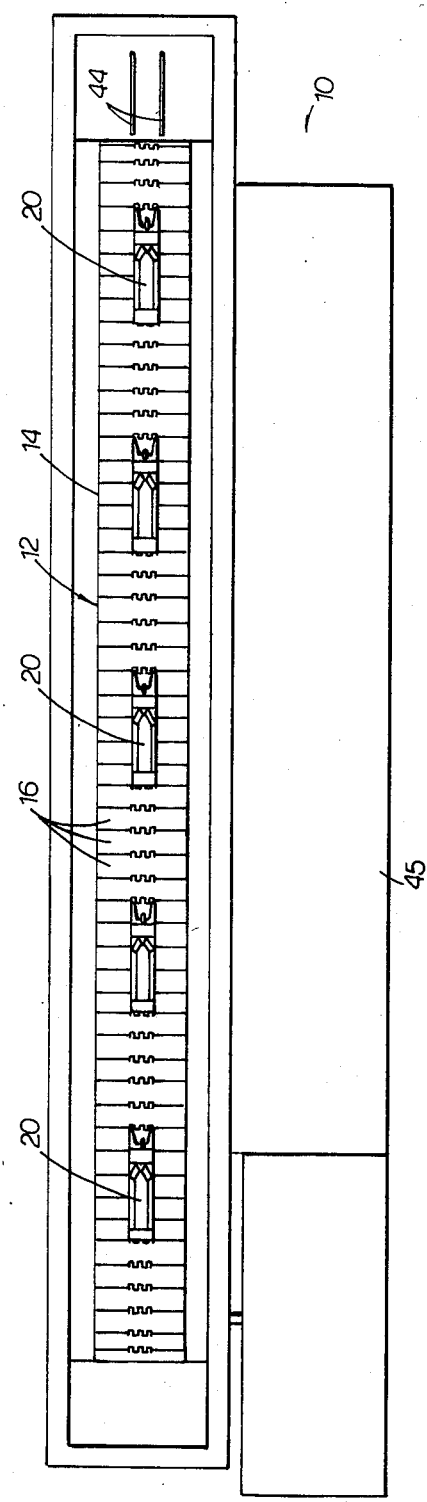
FIG. 2 is a plan view thereof.

Referring now in more detail to the drawings, wherein like numerals indicate like parts throughout the several views, FIG. 1 illustrates the poultry breast filleting system 10 which includes a framework 11 supporting a continuous conveyor system 12 that includes an upper horizontal flight 14 and a lower horizontal flight 15 formed of a series of hingedly connected conveyor plates 16 (FIG. 2) extended about sprocket elements 18 and 19 which are supported by the framework.

A plurality of mandrels or carcass carriers 20 are mounted in spaced series on the conveyor system, by connecting each carcass carrier to one of the conveyor plates 16. This causes the carcass carriers to be moved in series along an upper horizontal processing path and then along the lower horizontal processing path of the conveyor system. An electric motor (not shown) drives conveyor sprocket 18.

Figure 5:
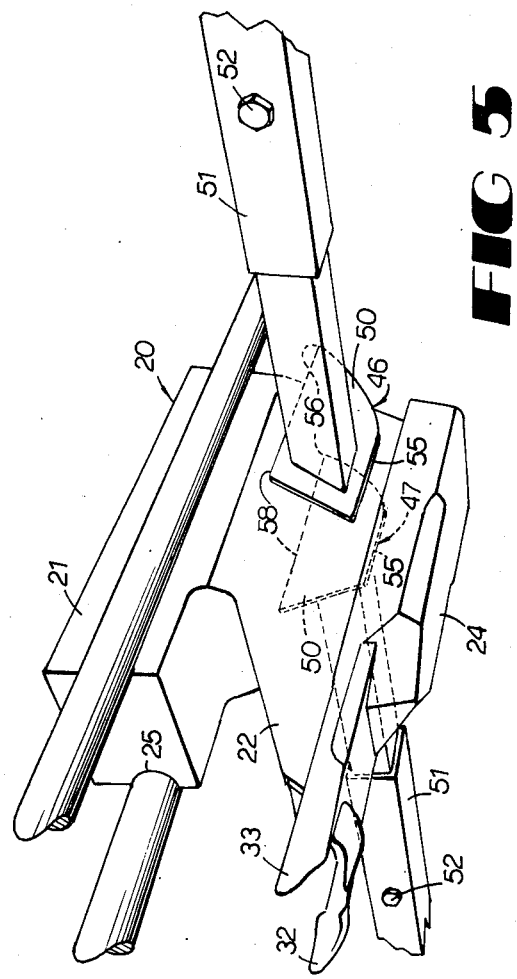
FIG. 5 is a detail illustration of the stationary blades of the system, demonstrating how the carcass carrier passes between the blades.
Figure 4:
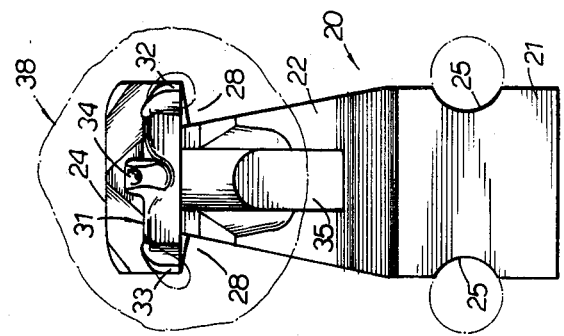
FIG. 4 is a front elevational view of a carcass carrier, with a poultry carcass mounted thereto.
Figure 3:
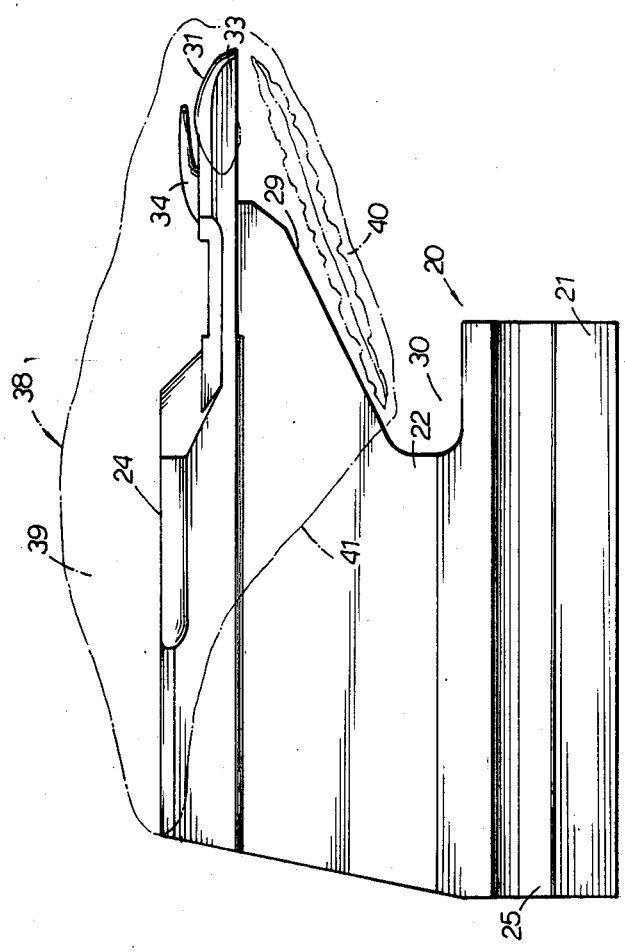
FIG. 3 is a side elevational view of a carcass carrier, showing a previously eviscerated poultry carcass, with legs and wings removed, mounted thereto.

As illustrated in FIG. 3-5, each carcass carrier 20 comprises a base 21, a tapered middle body portion 22 and head 24. Base 21 is generally of rectangular configuration and includes elongated parallel grooves 25 on opposite sides thereof. The grooves 25 cooperate with a pair of parallel rails 26 (FIG. 1) which extend longitudinally adjacent the lower flight 15 of the conveyor system, and the grooves 25 ride on the rails 26 as the carriers move along the lower processing path. The rails tend to stabilize the carriers as the carriers move along the processing line, keeping the carriers in a predetermined attitude as the meat is stripped from the poultry carcass.

As further illustrated in FIGS. 2-5, the tapered middle body portion 22 of the carcass carrier 20 is tapered upwardly and inwardly from base 21, and head 24 is wider than the middle body portion 22. Head 24 overlies both sides of the middle body portion and defines side recesses 28 on opposite sides of the middle body portion beneath the head. The middle body portion 22 also tapers upwardly and forwardly at 29 and forms a forward facing recess 30 above base 21. Wing socket bracket 31 is mounted at the apex of taper 29 and includes a pair of forwardly facing wing socket protrusions 32 and 33 and an intermediate protrusion 34. A slot 35 is formed in the tapered portion 29 of middle body 22.

As illustrated in FIGS. 3 and 4, a poultry carcass 38 is mounted on the carcass carrier 20. The poultry carcass is a previously eviscerated carcass with its neck, wings and saddle (including both legs and a portion of the back) removed, leaving the breast 39 and a portion of the back 40. The carcass 38 is mounted to the carrier 20 by mounting the larger opening 41 of the carcass over the wing socket bracket until the breast 39 rests on the head 24, the back 40 engages the taper 29 and the wing socket protrusions 32 are inserted into the wing sockets of the skeletal structure of the carcass. The intermediate protrusion 34 of the wing socket bracket 31 is inserted into the carcass, above the skeletal portion that defines the wing sockets, so as to clip this portion of the skeletal structure of the carcass to the wing socket bracket. This causes the major portion of the skeletal structure to extend rearwardly from the wing socket bracket 31. The general shape of the carcass carrier 20 is such as to generally fill the visceral cavity of the carcass, so as to support the carcass in a prescribed shape. It will be seen that when the carcass is engaged by the various implements of the system, the skeletal portion of the carcass will be pressed toward engagement with the carrier, causing the carrier to function as a mandrel that supports the skeletal structure in a predetermined position during the meat removing process.

As illustrated in FIG. 1, the continuous conveyor system 12 operates to move the carcass carriers 20 along the upper horizontal flight 14 where the carcasses 38 are mounted on the carcass carriers 20, and then the carcass carriers move about the conveyor sprocket 19 so as to become inverted and move in the opposite direction along lower horizontal flight 15. Carcass guide rails 44 extend about sprocket 19 and continue along the lower flight 15 of the conveyor system, and function to engage the carcasses 38 of each carrier just as the carrier is beginning its inversion from the upper flight to the lower flight, and the guide rails 44 continue along the length of the lower horizontal flight of the conveyor, so as to continue to support the carcass of each carrier. A worker platform 45 is supported by framework 11, and workers stand on the platform 45 and mount the carcasses 38 on the carriers 20 as the carriers move along the upper flight of the conveyor system.

As the carcasses are carried along the lower horizontal flight, the carcasses pass a series of work stations where several meat removing implements engage the carcass and tend to pull the meat from the skeletal structures of the carcasses. The first implement comprises a pair of stationary blades 46 and 47 which are positioned on opposite sides of the path of the carcass carrier 20 (FIGS. 1 and 5). The stationary blades 46 and 47 each comprise a substantially flat plate 50 mounted in an attitude such that its flat surface is approximately parallel to the side surfaces of the tapered middle body portion 22 of the carcass carrier. The flat plate 50 of each stationary blade 46 and 47 is supported by telescopic support 51 which permits the flat plate to be moved closer to or further away from the path of the carcass carrier 20 by loosening the set screw 52 and adjusting the relative positions of the telescopic elements. The rearwardly facing edge 54 of each flat plate 50 is tapered upwardly and rearwardly from the lower edge 55 so as to form a pointed portion 56 adjacent the upper edge 58. With this shape and placement, when a carcass 38 is moved by a carrier 20 between the stationary blades 46 and 47, the blades tend to slice into the meat beginning at the front of the carcass and the blades tend to separate the meat from the skeletal structure of the carcass. As the blades perform their separating function, they also tend to urge the skeletal structure toward the carrier 20, so that the carrier tends to support the skeletal structure as the meat is removed from the skeletal structure. Plates 50 tend to push the ribs of the skeletal structure of the carcass into the side recesses 28 of the carrier, and the plates engage the relatively thin layer of meat which extends from the breast about the ribs adjacent the back bone, loosening and removing the rib meat. The removed meat then is attached only to the breast meat and continues to be carried by the carcass on through the subsequent work stations.

Figure 6:
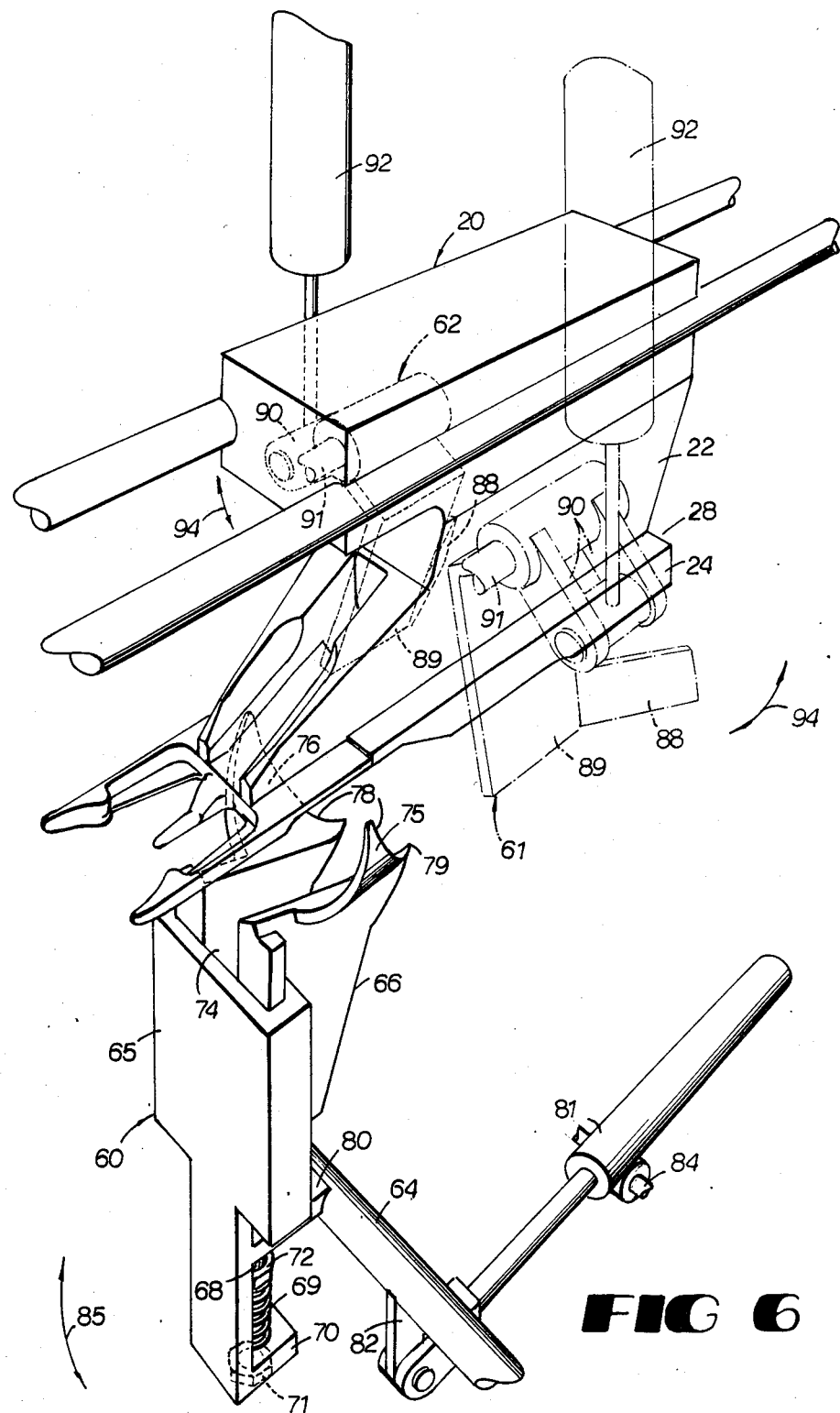
FIG. 6 is a detail illustration of the side block assemblies and bottom block assembly and how the carcass carrier passes adjacent these assemblies.

As illustrated in FIGS. 1 and 6, the carriers 20 next move the carcasses through the work station that includes the bottom block assembly 60, and the side block assemblies 61 and 62 which are positioned just before bottom block assembly along the direction of movement of the carriers 20. Bottom block assembly 60 is mounted on a rotatable cross shaft 64 and includes support plate 65 and resiliently supported breast block 66. Breast block 66 is slidably received in a pair of slots (not shown) of support plate 65, and includes a stem 68 that has a coil compression spring 69 mounted thereon and which passes through an opening in a spring plate 70. A pair of nuts 71 and 72 are mounted to the stem 68 on opposite sides of spring 69, with nut 71 being on the remote side of spring plate 70, so that spring 69 biases breast block 66 upwardly with respect to support plate 65 to the position illustrated in FIG. 6. Breast block 66 can be moved downwardly against the bias of its spring.

Breast block 66 is bifurcated in its upper portion, defining a central slot 74, and a pair of upwardly extending wing protrusions 75 and 76 are formed at the upper portion of breast block 66. Wing protrusions 75 and 76 are tapered outwardly so as to form a concave recess on opposite sides of slot 74 which generally corresponds to the shape of the breast bones and keel of a bird as carried on a carrier, and the upper edges 78 of each wing protrusion are curved upwardly and rearwardly from a forward point 79.

The bottom block assembly 60 is mounted by bracket 80 to shaft 64, and cylinder 81 is connected to lever 82 which rotates shaft 64 and bottom block assembly 60. Cylinder 81 is mounted to its own cross shaft 84. With this arrangement, bottom block assembly 60 is pivotable between an upright position as illustrated in FIG. 6 to a downward retracted position when it moves in response to the action of its cylinder 81 in the directions as indicated by arrow 85.

When bottom block assembly 60 is in its upright position, its wing protrusions 75 and 76 generally tend to conform to the breast bone and keel of the breast 39 of the poultry carcass 38 mounted on the carrier 20. Therefore, when a carrier brings the carcass to the bottom block assembly, the wings 75 and 76 tend to push and slice the meat of the carcass away from the skeletal structure thereof. The pointed portions 79 of each of the wing protrustions 75 and 76 tend to slice and gouge into the meat toward the skeletal structure, and the following tapered upper edges 70 tend to continue this gouging and slicing function to remove the meat from the skeletal structure. The pointed portions 79 of the bottom block cuts the muscle of the breast which is connected to the wing joints and extends through the breast tissue. The breast generally comprises two portions, the main fillet and the inside fillet, and this muscle should be cut in order to avoid having the main and inside fillets from becoming separated. The edges sloping down from the pointed portions 79 of the bottom block remove the meat from about the wishbone. In the meantime, the breast block 66 has the ability to move against the bias of its spring 69 through the support plate 65 so as to avoid destruction of the skeletal structure of the carcass.

As further illustrated in FIG. 6, each side block assembly 61 and 62 is of similar construction, with the parts being mirror images, and each includes a pressure plate 88 mounted on and extending rearwardly from a support plate 89. Pivot links 90 are attached at one end to support plate 89 and pivot about pivot pins 91. A cylinder 92 is connected to the distal end of the pivot links 90 and cause the pressure plate 88 to move toward and away from the path of the carcass carrier 20 as indicated by arrow 94. Pressure plates 88 are arranged to engage the carcass 38 to be carried by a carrier 20 at a position at the head 24 of the carrier, so that the pressure plates 88 tend to engage the areas of the wing sockets and urge the carcass to properly seat on the carrier as the bottom block performs its work. The side blocks tend to laterally compress the wishbone so that the wishbone will pass by the pointed portions 79 of the wing protrusions and through the central slot 74 of the bottom block and the bottom block will not break the wishbone. The bottom block assembly 60 removes a substantial amount of the breast meat from the skeletal structure and the meat clings to the skeletal structure and tends to hang from the skeletal structure.

After the bottom block assembly has performed its meat removing function, it is desirable to have the bottom block assembly 60 and the side block assemblies 61 and 62 retracted out of the way of the carrier and the carcass. The cylinders 81 and 92 function to pivot these elements away from the processing path as indicated by arrows 85 and 94. The meat is then permitted to hang away from the skeletal structure of the carcass as the carrier and carcass continue toward the next work station.

As illustrated in FIGS. 1 and 7, the tunnel assembly 96 is located next in the path of travel of the carcass carriers 20. Tunnel assembly 96 includes a pair of tunnel plates 98 and 99 of reverse, complimentary shape, with each tunnel plate being generally of L-shaped configuration including side wall 100, bottom wall 101, tapered rearwardly facing edge 102. Each tunnel plate 98 and 99 is supported by a support plate 104 which is mounted on its hinge pivot 105 about a pivot pin 106, and lever 108 extends from the hinge pivot away from plate 104, so that cylinder 109 is connected to the distal end of the lever and functions to pivot each tunnel plate towards and away from the other tunnel plate as indicated by arrows 110 and 111. When the tunnel plates are moved together they form a tunnel through which the carcass carrier 20 and the carcass mounted thereon passes.

When the tunnel plates 98 and 99 are moved toward each other to the positions shown in FIG. 7, the carrier 20 will have moved its poultry carcass to a position where the wing joints are just inside the tunnel so that the inward closing movements of the tunnel plates 98 and 99 will tend to press the wing sockets of the carcass inwardly toward the carrier. The spacing of side walls 100 is such that the skeletal structure of the carcass with the wing sockets compressed just fits inside the side walls 100 and just above the bottom walls 101, so that the rearwardly facing edge 102 of the tunnel plates 98 and 99 tend to cut and scrape the meat away from the skeletal structure of the carcass as the carrier and carcass move through the tunnel. It will be noted that a slot 114 is formed between the tunnel plates 98 and 99 when in their closed positions, so that the keel bone of the carcass can partially protrude through the slot and leave a small amount of connection between meat and skeletal structure of a carcass as the carrier and carcass move on beyond tunnel assembly 96.

As illustrated in FIG. 8, the fillet catcher 116 and its fillet remover gears 118 and remover roll 119 are positioned further along the processing path from tunnel assembly 96. Fillet catcher 116 is a bifurcated structure that includes tines 120 and 121 that form a slot 122 therebetween, with outside fenders formed on each tine, with the tines supported at one end on stationary support rod 126 and projecting rearwardly along the processing path from the support rod 126. The tines 120 and 121 diverge away from each other at the rearward ends of the tines so as to form a wedge shape at this portion of the slot 122.

Fillet remover gears 118 comprise a pair of gears 118 mounted on a common shaft 128 and the gears rotate in the direction as indicated by arrow 129, such that the rearward facing surfaces of the gears 118 rotate downwardly with respect to the oncoming carrier and poultry carcass. Likewise, fillet remover roll 119 rotates on its shaft 130 in the direction indicated by arrow 131 so that its rearwardly facing surface rotates in a downward direction with respect to the oncoming carrier and poultry carcass.

When the carcass carrier 20 approaches the fillet catcher 116, a substantial amount of the meat will have been removed from the skeletal structure still supported on the carcass carrier, and most of the meat will be hanging in a downward direction from the carcass carrier. The downwardly hanging portion of the meat will pass beneath the fillet catcher 116 and become engaged by the downwardly moving rearwardly facing surfaces of the fillet remover roll 119, which tends to apply a downward and rearward force to the oncoming meat, tending to pull the meat away from the skeletal structure of the carcass. Further, the tines 120 and 121 of the fillet catcher tend to further guide the clinging portion of the meat toward the slot 122 so that further friction is applied by the tines to the meat. The keel bone tends to pass through the slot 122 between the tines 102 and 121 and the teeth of the gears 118 tend to brush against the keel bone and remove the fleece from the breast and keel bone. The additional friction applied by the tines 120 and 121 and the teeth of the gear 118 tends to strip any remaining portion of the meat from the carcass carrier 20, and the meat tends to drop in a downward direction away from the carcass carrier 20, while the skeletal portion of the carcass tends to remain on the carcass carrier.

As illustrated in FIG. 1, stripper wheel 135 is positioned at a processing station further along the direction of movement of the conveyor system from fillet catcher 116. Stripper wheel 135 rotates on axle 136 so that its upper surface rotates as indicated by arrow 138 in the direction of movement in the carcass carriers 20. Stripper wheel 135 is located just below the path of movement of the carcass carriers 20, and its upper moving surface tends to engage the skeletal structure remaining on the carcass carrier and move the skeletal structure in the direction of movement of the carcass carrier but at a faster rate than the carcass carrier, which tends to pull the skeletal structure off the carcass carrier. The skeletal structure tends to fall by gravity away from the carcass carrier, leaving the carcass carrier free at this position so that it can be moved with the conveyor system about conveyor sprocket 18 and inverted back to an upright position and moved along the upper flight of the conveyor system.

It should be understood that the just described embodiment merely illustrates principles of the invention in one preferred form. Many modifications, additions and deletions may, of course, be made thereto without departure from the spirit and scope of the invention as set forth in the following claims.

We claim:

1. Filleting apparatus for removing the fillets from previously eviscerated poultry carcasses of which the legs, the wings and the skin have been removed already, said apparatus comprising a frame, a conveyor mounted on and movable about said frame, a plurality of carcass carriers mounted on said conveyor at spaced intervals and movable along a path about said frame, each said carcass carriers including a carcass moulding portion that is sized and shaped to approximately fit the previously eviscerated body cavity of a poultry carcass so that the body cavity of a poultry carcass can be mounted on and carried along the path by each carcass carrier with the moulding portion maintaining the shape of the body cavity and a pair of protrusions for engaging the wing sockets of the skeletal structure of the carcass to hold the carcass on the carcass carrier, at least one meat removing implement mounted along the path of said carcass carrier formed with a shape that corresponds to the profile of the skeletal structure of the poultry carcasses, whereby when a poultry carcass is carried by a carcass carrier adjacent the meat removing implement the meat of the carcass is separated from the skeletal structure of the carcass.

2. The filleting apparatus of claim 1 and wherein said meat removing member comprises a series of meat engaging members spaced along the path of said carcass carriers with each meat engaging member shaped and located so as to separately engage different portions of the carcasses so as to progressively remove different portions of the meat from the skeletal structure of the carcass.

3. A method of removing meat from previously eviscerated poultry carcasses with wings removed therefrom comprising
mounting each carcass on a carrier with a pair of protrusions of the carrier extending into the wing sockets of the carcass,
moving the carriers with carcasses mounted thereon in series along a processing path with the protrusions facing in the direction of movement, and
as the carriers with carcasses mounted thereon move along the processing path, engaging and retarding the movement of the meat of the carcass so as to remove the meat from the skeletal structure of the carcass.

4. The method of claim 3 and wherein the step of mounting each carcass on a carrier with the pair of protrusions of the carrier extending into the wing sockets of the carcass includes the placement of another holding protrusion of the carrier about the skeletal structure of the carcass to retain the carcass on the pair of protrusions.

5. Apparatus for filleting previously eviscerated poultry carcasses of which at least the legs, wings and skin have been removed, said apparatus comprising a conveyor, a plurality of carcass carriers supported by said conveyor at intervals spaced along the conveyor and movable through a processing path first along an upper horizontal carcass loading path and then along a lower horizontal deboning path, and said carcass carriers each including a carcass moulding portion to fit in and mould the visceral cavity of a poultry carcass to a predetermined size, at least one meat removing member positioned at a predetermined distance from the path of said carcass carriers which corresponds to the shape of the skeletal structure of the carcasses as carried by the carcass carriers for engaging and removing the meat from the skeleton of the carcasses, said meat removing member defining a space with respect to the carriers that corresponds to the profile of the skeletal structure of the poultry carcasses moved by said carriers which is smaller than the space occupied by the profile of the carcass with the meat attached to the skeletal structure of the carcass, whereby when a poultry carcass is moved on a carcass carrier along the processing path through the gate, the meat of the carcass is stripped from the skeletal structure of the carcass.

6. A method of filleting previously eviscerated poultry carcasses with wings and legs removed comprising mounting carcasses on a series of carcass carriers each of which fits into the cavity of the skeletal structure of the poultry carcass so as to mould the visceral cavity of the poultry carcass to a predetermined size, engaging with each carcass carrier the joint openings of the removed wings so as to hold the skeletal portion of the carcass to the carrier, moving the carcass carriers each with a poultry carcass mounted thereon to a meat removing member that defines a passage that corresponds to the profile of the skeletal structure of the poultry carcasses mounted on the carriers, and as each poultry carcass passes by the meat removing member, engaging and stripping with the meat removing member the meat from the skeletal structure of the poultry carcass.

* * * * *